O. KRAUS.
APPARATUS FOR THE PRODUCTION OF WORKING FLUIDS FOR MOTORS.
APPLICATION FILED JUNE 18, 1912.
1,087,451.
Patented Feb. 17, 1914.
6 SHEETS—SHEET 1.
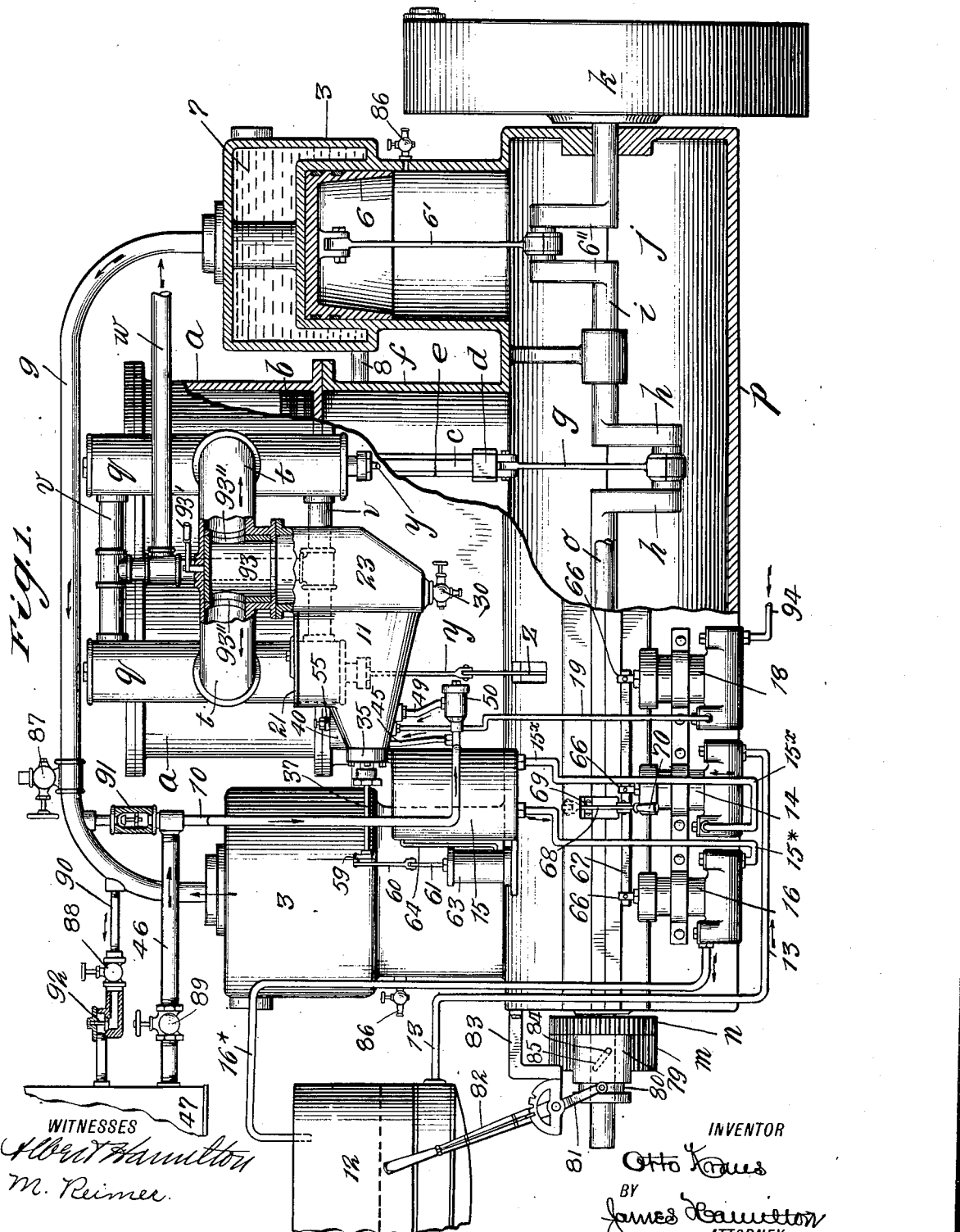
WITNESSES
INVENTOR
ATTORNEY O. KRAUS.
APPARATUS FOR THE PRODUCTION OF WORKING FLUIDS FOR MOTORS.
APPLICATION FILED JUNE 18, 1912.
1,087,451.
Patented Feb. 17, 1914.
6 SHEETS—SHEET 2.
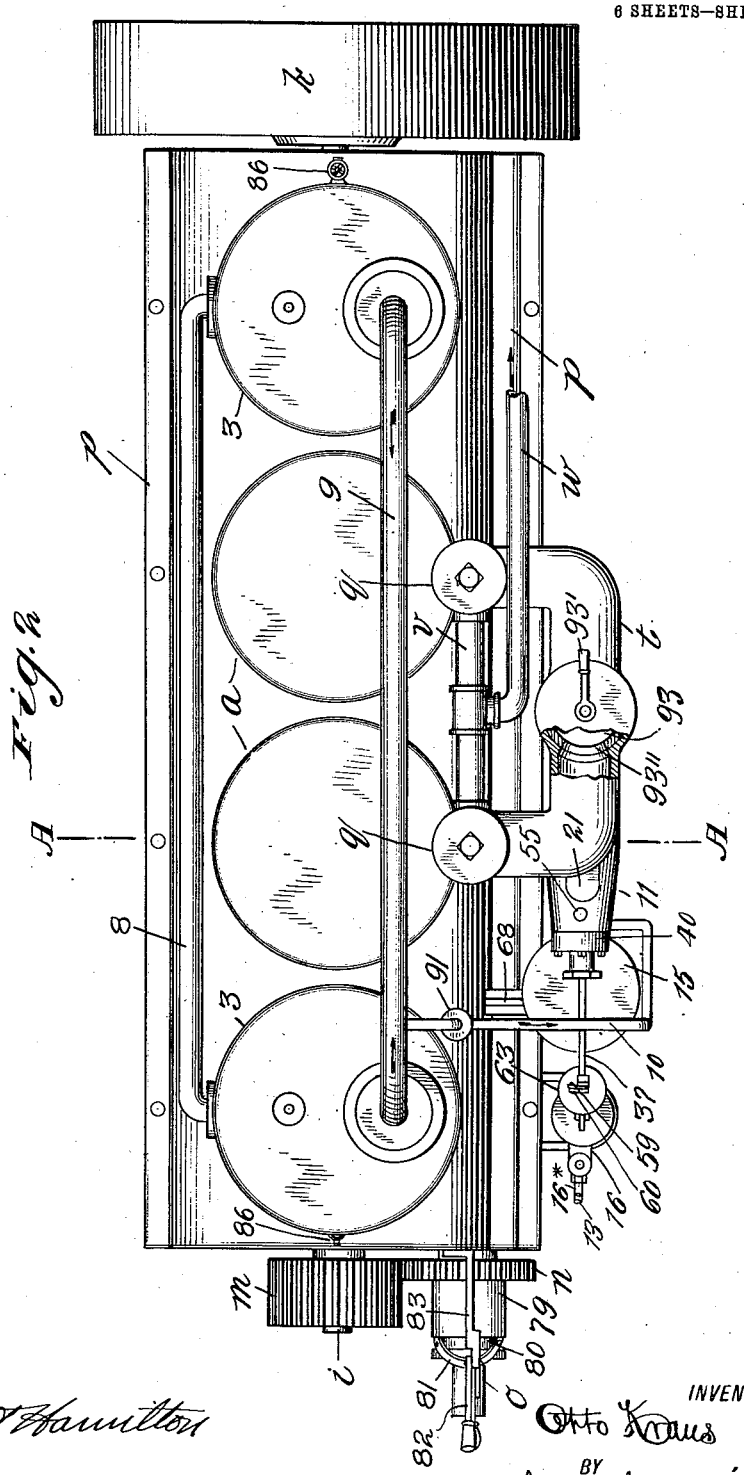
WITNESSES
INVENTOR
Otto Kraus
BY
James Hamilton
ATTORNEY

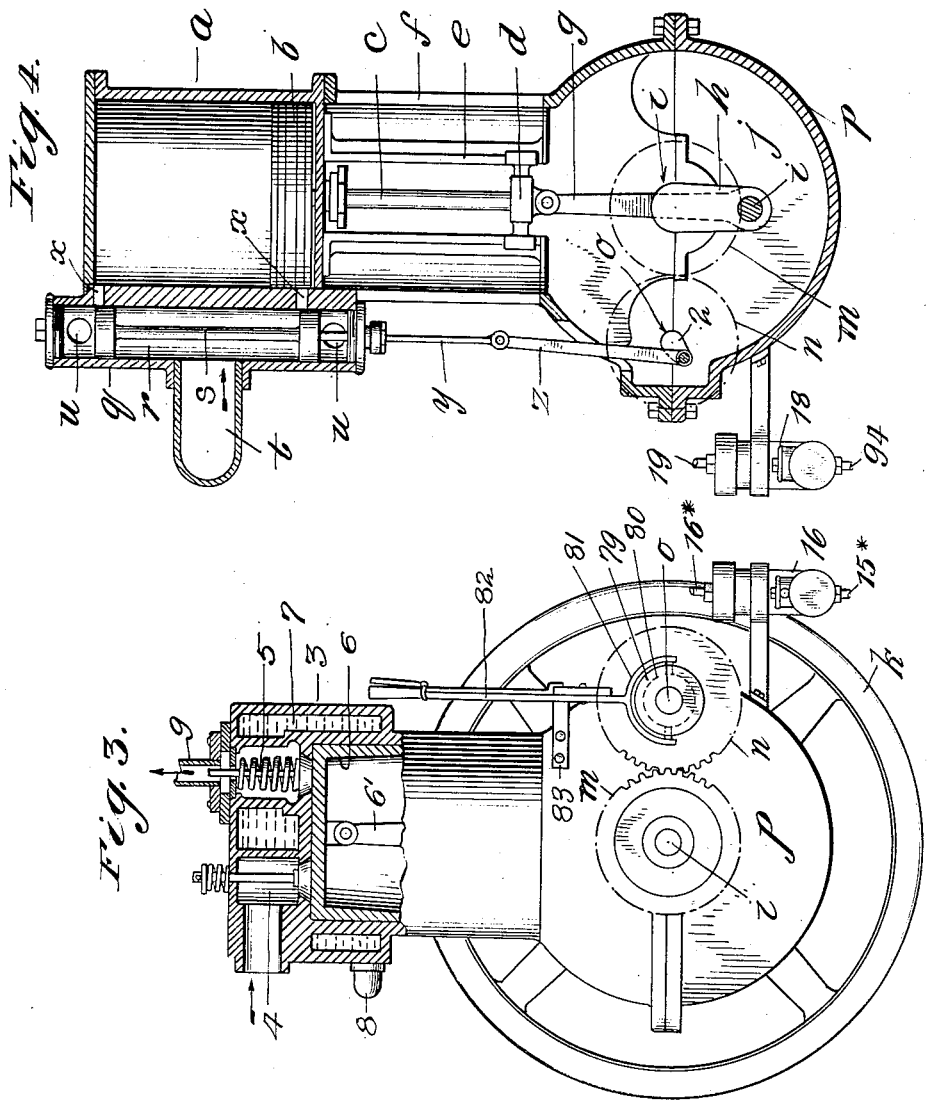

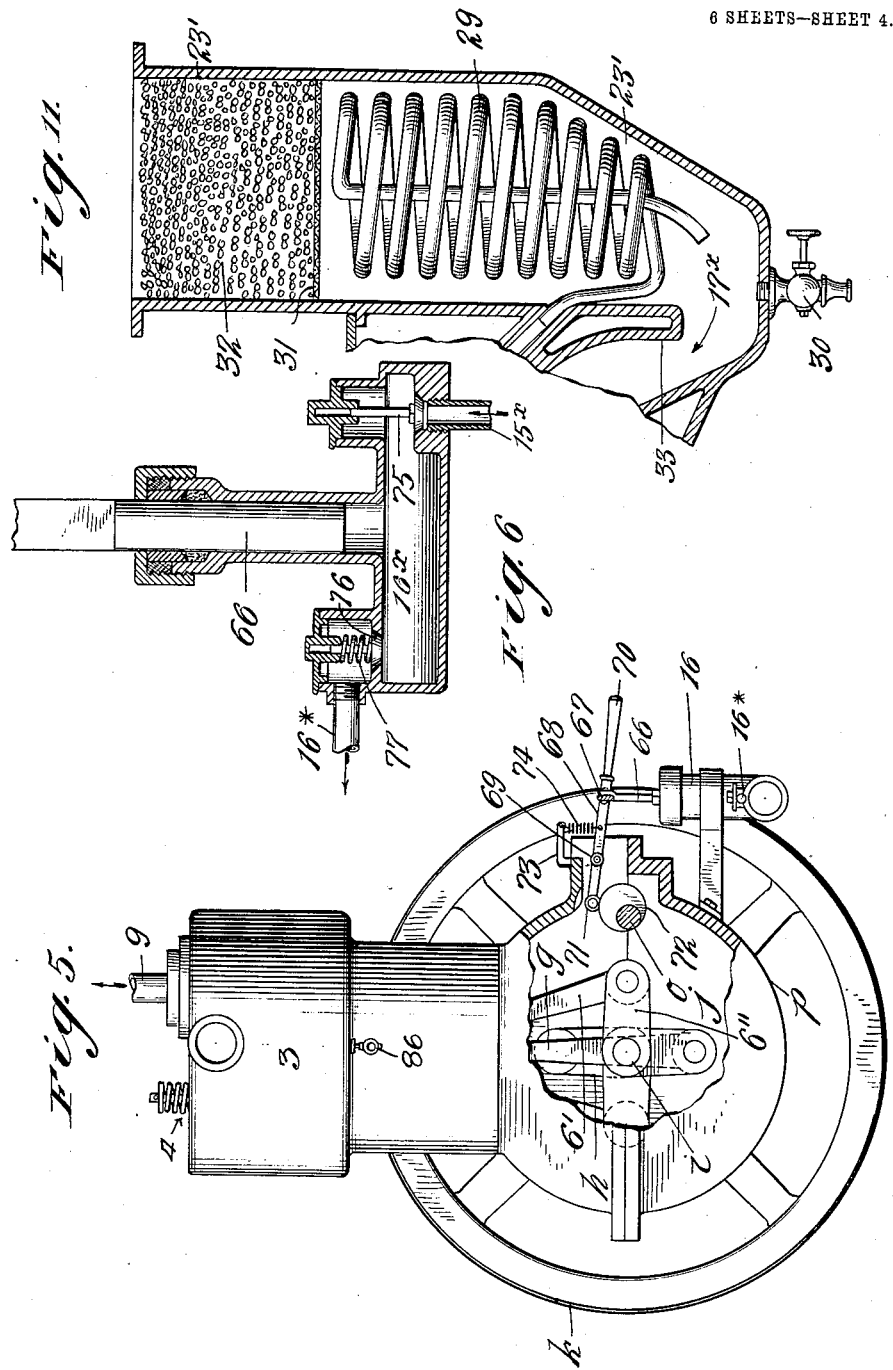

O. KRAUS.
APPARATUS FOR THE PRODUCTION OF WORKING FLUIDS FOR MOTORS.
APPLICATION FILED JUNE 18, 1912.
1,087,451.
Patented Feb. 17, 1914.
6 SHEETS—SHEET 5.
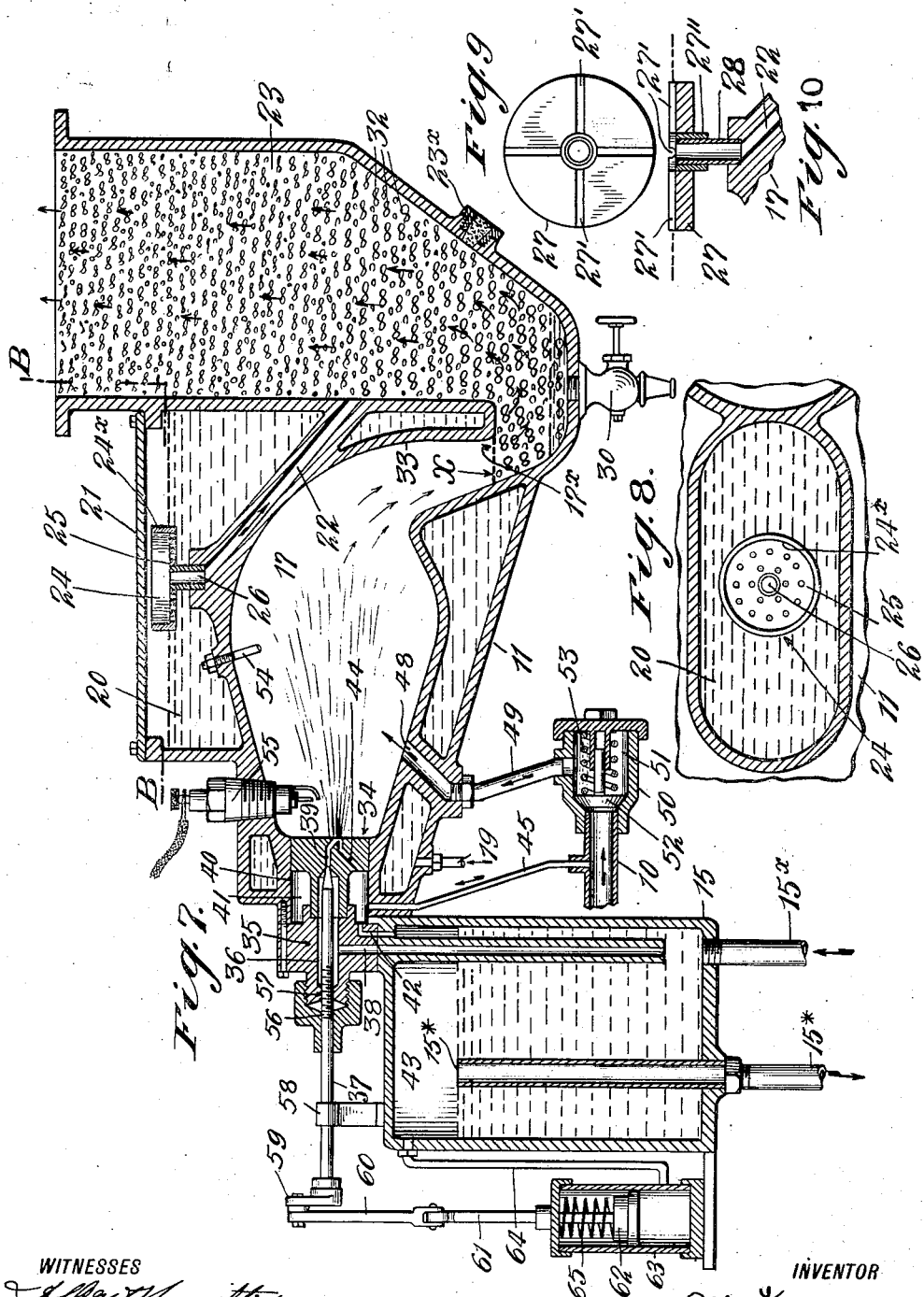

O. KRAUS.
APPARATUS FOR THE PRODUCTION OF WORKING FLUIDS FOR MOTORS.
APPLICATION FILED JUNE 18, 1912.
1,087,451.
Patented Feb. 17, 1914.
6 SHEETS—SHEET 6.
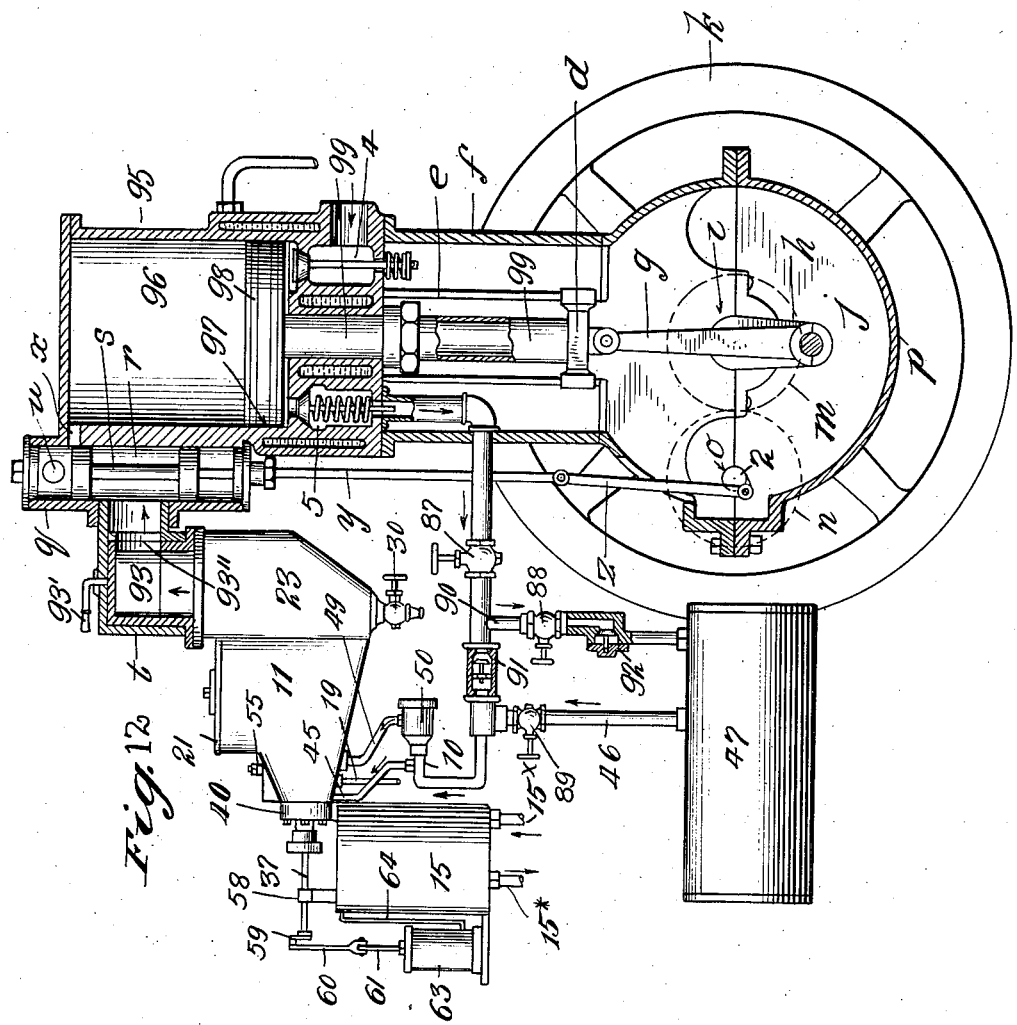
WITNESSES
INVENTOR
Otto Kraus
BY
James Hamilton
ATTORNEY

UNITED STATES PATENT OFFICE.

OTTO KRAUS, OF NEW YORK, N. Y., ASSIGNOR TO KRAUS ENGINE COMPANY, OF NEW YORK, N. Y., A CORPORATION OF NEW YORK.

APPARATUS FOR THE PRODUCTION OF WORKING FLUIDS FOR MOTORS.

1,087,451. Specification of Letters Patent. Patented Feb. 17, 1914.

Application filed June 18, 1912. Serial No. 704,323.

*To all whom it may concern:*

Be it known that I, OTTO KRAUS, a citizen of the United States, residing in the borough of Manhattan, in the city, county, and State of New York, have invented certain new and useful Improvements in Apparatus for the Production of Working Fluids for Motors, of which the following is a specification, reference being had to the accompanying drawings.

The production of working fluids for motors by burning combustibles (coal, oil and the like) and mixing the products of combustion with steam is known. It has also been suggested to preheat oil, burn the same, direct the products of combustion in a vertically-ascending stream against a heating-surface comprising sheets of woven wire and pouring water down upon the latter from a sprinkler-head or rose arranged above the same. It has been further suggested to burn oil issuing in a spray from an atomizer and to direct the products of combustion through a chamber filled with refractory material saturated with water. Still another method, which was proposed many years ago, is to preheat air by the heat from the products of combustion and then pass the preheated air through refractory material saturated with water. None of these methods has proved practicable; nor have any of the structures devised for carrying out these methods proved satisfactory in practice. It has been found difficult to control the temperature at which the working fluid is admitted to the working cylinders of the motor. In some cases it has been found impracticable to cool the products of combustion sufficiently and the working fluid has, therefore, entered the cylinders at so high a temperature as to injure the working parts. In other cases the products of combustion have been cooled unduly and the heat given up by them has been dissipated so as to be unavailable for the production of power in the engine. In still other cases the combustion chamber has been flooded with water so that the practical execution of the general idea or conception was found to be impossible.

By the present invention it is sought to provide in an apparatus of this class novel features which will insure operativeness and commercial success under the severe and trying conditions of modern practice and to avoid the defects which have proved so fatal to prior structures of this type. In the oil-feeding mechanism provision is made for keeping the level of the oil constant under all conditions of service; and by arranging between the pump-chamber and the discharge conduit of the oil-return pump a spring-pressed valve which opens only when the pressure upon the same exceeds any pressure which under normal conditions is likely to exist in the oil-reservoir, the level of the oil in the latter is maintained constant under all conditions of service. In the supply of water to the steam-generating chamber, the level of the water in the tank, at the inlet to the channel through which the water flows, to the chamber is kept constant, although the apparatus may be tilted from side to side; and the water is caused to enter the inlet in a quiet flow, although the water in the tank may be in a state of ebullition. Provision is made for insuring that the air flowing through the air-inlet passage of the atomizer will be at a higher pressure than the back-pressure in the combustion chamber; and air is supplied to the same in sufficient quantity and at such a pressure as to insure the complete combustion of the oil supplied thereto, which is affected at even low pressures. The flooding of the combustion chamber is carefully guarded against. The hot products of combustion are led in a substantially horizontal direction and by their pressure force their way through a U-shaped passage by which communication is established between the combustion chamber and the steam-generating chamber. In this passage, which is near the bottom of the steam-generating chamber, a sort of water-trap or water-seal may be formed as follows: The water trickles down into the bottom of the steam-generating chamber from the water-tank through the hereinbefore-mentioned water-channel and, if a temporary surplusage be supplied, it collects in a little pool in the U-shaped passage at the bottom of the steam-generating chamber. The hot products of combustion then force their way through and lick up the water and entrain it in their passage into the latter. The pressure of the gases in the combustion chamber is always enough to prevent the water from entering thereinto in a quantity sufficiently large to affect injuriously the working of the parts thereof;

in fact, the quantity of water which at the maximum enters the combustion chamber is inconsiderable.

In case a large amount of energy is needed suddenly and for a short time, as in starting a locomotive or ascending a steep grade, the air-compressors may be thrown out of operation temporarily and compressed air for running the apparatus may be drawn from the above-mentioned compressed-air reservoir, whereby the power normally used for driving the air-compressors is made available for other purposes.

In the drawings illustrating the principle of this invention and the best mode now known to me of applying that principle, Figure 1 is a front elevation, partly in section; Fig. 2 is a plan, parts being broken away to show the throttle; Fig. 3 is an end elevation, parts being shown removed and broken away for the sake of clearness of illustration; Fig. 4 is a section on the line A—A of Fig. 2, certain parts being omitted for the sake of clearness; Fig. 5 is an elevation of one of the air-compressors and shows the lever for operating the pumps and the relative positions of the engine-cranks and the air-compressor cranks; Fig. 6 is a detail illustrating the interior of the pump and the spring-pressed valve controlling the port leading from the pump-chamber to the discharge conduit; Fig. 7 is a central, longitudinal section through the combustion and steam-generating chambers and connected parts; Fig. 8 is a section on the line B—B of Fig. 7; Figs. 9 and 10 are detail views illustrative of a modified form of inlet. the same being a buoyant inlet; Fig. 11 is a sectional view of a modified form of steam-generating chamber; and Fig. 12 shows a modified form of motor which is of low first cost and in which the same cylinder serves as a working cylinder and an air-compressor cylinder.

The structure as a whole consists of three main parts: namely, (1) an engine proper in which the working fluid is utilized and its heat energy is transformed into mechanical energy; (2) the supply apparatus by which the air, liquid fuel and water are supplied for the production of the working fluid; and (3) the working-fluid generator in which the oil is burned and the products of combustion are thoroughly mixed with water and thereby transformed into the working fluid.

In the preferred embodiment shown in Figs. 1 to 8 the engine proper is shown as a two-cylinder, double-acting motor. In each working cylinder $a$ there is mounted the usual piston $b$ to which is suitably attached an ordinary piston-rod $c$ carrying at its lower end a crosshead $d$ which slides upon guideways $e$ formed in the engine-frame $f$. By means of connecting-rods $g$ these pistons are connected with cranks $h$ formed upon the engine-shaft $i$, which is mounted in the crank-chamber $j$ and upon one end of which is fastened a flywheel $k$ and upon the opposite end of which is mounted a spur-gear $m$ in mesh with a spur-gear $n$ that serves to drive but is lengthwise movable of the engine-valve operating shaft $o$. This shaft $o$ extends parallel to the engine shaft and lies within the crank-casing $p$. Each working cylinder $a$ is provided with a valve-casing $q$ which incloses a valve-chamber $r$, in which is mounted a double-headed slide-valve $s$ of the piston type and which communicates near its middle with the inlet conduit $t$ for the working fluid. The valve-casing $q$ is formed at its top and bottom with exhaust ports $u$ through which the exhaust passes into the branch exhaust-pipes $v$ and thence to the main exhaust-pipe $w$, which discharges into the open air or into a condenser (not shown) depending upon whether the engine is of the non-condensing or condensing type. The valve-chamber $r$ communicates with the interior of the working-cylinder $a$ through the ports $x$ which lead thereinto near the ends thereof and the opening and closing of which are controlled by the reciprocating movement of the piston-valve $s$. This valve is provided with a valve-stem or valve-rod $y$, which extends outside of the valve-casing $q$ and is connected by a connecting-rod $z$ with a crank-arm 2 carried by the valve-operating shaft $o$.

The engine proper is mounted between a pair of air-compressors 3 each of which is provided with an inlet-valve 4 and an outlet-valve 5 and each of which is provided with a piston 6 connected by a suitable connecting-rod 6' with the cranks 6'' formed upon the engine-shaft $i$. In the upper end of each air-compressor there is formed a water-space or water-chamber 7 so that these air-compressors are water-jacketed; and these water-chambers 7 are connected by a suitable water-pipe 8. These air-compressors discharge compressed air into a conduit 9. which through the valve-controlled pipe 10 communicates with the furnace 11, as hereinafter described.

The liquid fuel is supplied from an oil-tank 12, from which it is drawn through a pipe 13 by a suitable oil-supply pump 14 which forces the oil through the pipe $15^{x}$ into the oil-reservoir 15, where it is subjected to air pressure, as hereinafter described. Any overflow of oil through the overflow pipe $15^{*}$ from the oil-reservoir 15 is pumped back through the return pipe $16^{*}$ into the oil-tank 12 by the oil-return pump 16.

The walls of the combustion chamber 17 of the furnace 11 are hollow and the chambers in these walls are supplied with water by the water-supply pump 18, which forces the water through the water-inlet pipe 19 into these chambers. Therefore, the combustion-chamber 17 is water-jacketed. Above the top wall of the latter there is formed a water-tank or reservoir 20 which is closed by a cover 21. This water-tank communicates by an inclined channel 22 with the lower portion of the steam-generating chamber 23 and is preferably symmetrical in horizontal section and formed with vertical side walls, since this form is best adapted to prevent change of water-level at the inlet due to tilting of the tank. The upper end of this passage 22 is provided with a cup-shaped inlet 24 having a foraminated bottom 25 to permit the water to flow into the cup 24 and thence down the hollow stem 26 thereof into the passage 22. Since the surface of the water in the tank is liable to become disturbed, if the water reaches boiling temperature, the lateral or cylindrical wall 24$^x$ of the cup is made sufficiently high to prevent the water boiling over into the cup. Even if the water in the tank be boiling, it will flow free from agitation through the small holes in the bottom of the cup; and in this manner the level of the water at the inlet 24 of the passage 22 is kept more uniform, which insures that the apparatus will work under uniform conditions as to the supply of water to the steam-generating chamber 23. The inlet 24 is centrally-disposed (Fig. 8); hence, where the apparatus is used in self-propelled vehicles and is, therefore, likely to be tilted, the tilting will not substantially affect the flow of the water from the water-tank 20, since the relation of the inlet 24 to the water-level is not materially changed by this tilting. If for any reason the water-level at the inlet is subject to fluctuations substantial in degree or the inlet cannot be conveniently arranged in the center of the tank 20, a buoyant inlet 27 may be used (Figs. 9 and 10). This inlet has a head 27 in which are formed radial slots 27′ which permit the flow of the water inwardly toward the centrally-disposed hollow guide-stem 27″ of the inlet, which is sleeved on the pipe 28 the lower end of which is fitted in the top of the passage 22.

In Fig. 11 there is illustrated a modification in which the steam-generating chamber 23′ is provided with a coil 29 of water-pipe, one end of which coil is inserted in the lower end of the inclined passage 22 and the other end of which discharges the water flowing therethrough into the bottom of the steam-generating chamber, which is provided with a suitable drain-cock 30. The coil 29 obviously acts as a water-heating coil; and above its top there is mounted a reticulated portion or grating 31 which supports pieces of metal or other suitable material which are loosely thrown into the steam-generating chamber and are of such size as to offer a large heating surface, while at the same time they are not so small as to impede unduly the passage of the working fluid through them; for example, a cheap metal-chain may be used for this purpose, the chain being so selected that its links 32 will offer a large heating surface, while the interstices between the links permit the flow of the working fluid without the creation of undue back pressure in the combustion chamber 17. As shown in Fig. 7, the use of a metal chain is contemplated in connection with the preferred embodiment of this invention also. The wall 33 which separates the combustion chamber 17 from the steam-generating chamber 23 extends down so far toward the bottom of the latter that the passage 17$^x$ through which communication is established between these two chambers is substantially U-shaped and a sort of water-trap may be formed therein as follows: The preheated water trickles down from the tank 20 through the channel 22; and, if there is any temporary surplusage of water, it will collect in the bottom of the passage 17$^x$. The pressure of the gases flowing from the combustion chamber is sufficient to keep the water from entering the latter to an injurious extent; in fact, the water will not rise above the level marked X in Fig. 7. This is an important feature of this invention.

Air and oil in the form of a spray enter the combustion-chamber 17 from the nozzle end 34 of the atomizer 35, which is formed with a valve-chamber 36 into which projects the inner pointed end of a needle-valve 37. The valve-chamber 36 communicates through an oil-feed passage 38 with the oil-reservoir 15 and through the oil-inlet passage 39 with the combustion-chamber 17. Obviously the needle-valve 37 controls the flow of the oil through the passage 39. Between the rear end of the atomizer-nozzle 34 and the wall 40 of the opening in which the atomizer-nozzle 34 is mounted there is an annular air-chamber 41 which at its outer end communicates through a passage 42 with the air-space 43 above the oil-level in the oil reservoir 15 and which at its opposite or inner end communicates through the air-inlet passage 44 with the interior of the furnace 11. The inlet passages 39, 44 are formed in the atomizer-nozzle 34 and merge at their inner ends (Fig. 7). Compressed air is supplied to the annular air-chamber 41 through a branch feed-pipe 45 which extends upwardly from the main compressed-air feed-pipe 10 which communicates with the conduit 9 and, through an air-pipe 46, with the compressed-air reservoir 47. The bottom of the furnace 11 is formed with an air-passage 48 into the outer end of which is fitted the upper end of an air-pipe 49 the lower end of which is inserted in an opening in the valve-casing 50. This valve-casing is carried by the discharge-end of the main air-feed pipe 10 and incloses the valve-chamber 51, in which is mounted a valve 52. A coil-spring 53 normally presses the head of the valve 52 toward the discharge end of the main air-feed pipe 10; and in addition to the pressure of the coil-spring 53 there is acting on the head of the valve 52 in the same direction the pressure of the gases in the combustion chamber 17 with which the valve-chamber 51 is in communication through the pipe 49 and the channel 48. Hence, when the air-pressure in the main air-feed pipe 10 is high enough to force the valve 52 open and, therefore, to discharge air into the combustion-chamber 17 through the air-passage 48 (which in the normal operation of the apparatus it is), it is insured that the air-pressure acting in the air-chamber 41 in the atomizer exceeds the back-pressure in the chamber 17 and is high enough to drive the oil and air through the passages 39, 44 in the atomizer-nozzle with thorough atomization of the oil and thence into the combustion-chamber against the back pressure of the gases therein. It is to be observed that the main supply of air is delivered into the combustion-chamber through the air-passage 48 at a substantial distance beyond the atomizer-nozzle 34. By this arrangement the mixture of oil and air issuing from the nozzle 34 is maintained rich in oil and, therefore, readily ignitible, while a supply of air sufficient for complete combustion is delivered through the air-passage 48. If the flame should go out, reignition occurs automatically from the heat stored up in a metal pin 54 the inner end of which projects into the combustion-chamber 17 through the top thereof, while its outer end is bathed and cooled by the water in the water-tank 20. For igniting the spray at the starting of the engine, a spark-plug 55 is provided (Fig. 7).

The needle valve 37 is provided with a threaded portion 56 which engages the threaded wall of an opening 57 in the outer end of its valve-casing, so that rotation of the needle valve 37 will result in its lengthwise movement. The stem of the needle-valve projects outwardly beyond its valve-casing and its projecting end is rotatably mounted in the upper end of a bracket 58 fastened to the top of the oil reservoir 15. To this projecting end there is fastened a rocker-arm 59 which is connected by a connecting-rod 60 to the upper end of the stem 61 of a headed plunger or piston 62, which is slidably mounted in a cylinder 63. That portion of the space within the latter which is below the plunger-head 62 is connected by the pipe 64 with the air-space 43 above the oil-level in the oil reservoir 15, so that the same air-pressure which acts upon the oil acts also upon the piston 62. Between this piston and the cap of the cylinder 63 is interposed a coil-spring 65. When the air-pressure exceeds a predetermined maximum, the piston 62 is forced upwardly against the tension of the spring 65 and thereby turns the needle-valve 37 in such a direction as to cause it to move outwardly and to enlarge the opening for the passage of the oil, the amount of which fed to the combustion chamber is thus increased proportionately to the increase in the density of the air. When the air-pressure falls below a predetermined minimum, the spring 65 forces the plunger-head 62 inwardly and thereby rotates the needle-valve 37 in an opposite direction, whereby the opening for the passage of the oil is narrowed and the weight of oil fed to the combustion chamber 17 is decreased proportionately to the decrease in the density of the air. By this arrangement the ratio of the weight of the oil which enters the mixture issuing from the atomizer-nozzle to the weight of the air in the mixture is automatically kept constant and the richness of the mixture is maintained.

The plungers 66 (Fig. 6) of the three pumps 14, 16, 18 are connected by a cross-bar 67 (Fig. 1) to which is attached a lever 68 which is fulcrumed at 69 in the crank-casing $p$ and the outer end of which is formed with a handle 70 and the inner end of which projects into the crank-chamber $j$ and rests through the medium of a cam-roller 71 upon a cam 72 carried by the valve-operating shaft $o$. Between the lever 68 and a bracket 73 attached to the crank-casing $p$ is interposed a coil spring 74 which presses the cam-roller 71 toward the cam 72. As the valve-controlling shaft $o$ rotates, the lever 68 will be rocked and will cause the reciprocation of the plungers 66 of the three pumps. In case the level of the oil in the oil-reservoir 15 is too low or there is not sufficient water in the water-jacket tank 20 at the time it is desired to start the engine, the operator by working the lever 68 by hand can bring the oil and water to their normal levels shown in Fig. 7.

As shown in Fig. 6, each of the three pumps is provided with a gravity-controlled inlet-valve 75 and a spring-pressed discharge-valve 76. In the case of the oil-return pump 16 the tension of the spring 77 of the discharge valve 76 is so adjusted that this valve will open only when the pressure acting in the pump chamber $16^x$ is greater than the highest air-pressure likely to exist in the oil-reservoir 15. The air cannot, therefore, flow continuously from the latter out through the pump-chamber $16^x$ past the discharge-valve 76. When, however, due to the overflow of oil through the pipe $15^*$ and the resulting decrease of the clearness in the pump-chamber, the pressure acting in the pump-chamber during the down stroke of the piston exceeds that for which the spring 77 is set, the discharge valve 76 will open and allow the oil to flow past it into the oil-return pipe 16*. By this arrangement the oil is kept under pressure and at a constant level in the oil-reservoir 15.

The toothed face of the spur-gear m which is fast upon one end of the engine shaft i is much wider than the toothed face of the spur-gear n which meshes with it; therefore, this spur-gear n may be moved lengthwise of the valve-operating shaft o and yet remain in mesh with the other spur-gear m. The spur-gear n is formed with a hub 79 the outer end of which is grooved circumferentially; and in this circumferential groove 80 is mounted the forked end 81 of a reversing lever 82 fulcrumed in a suitable bracket 83 attached to the crank-casing p. From the inner wall of the bore of the hub 79 there projects a pin 84 which enters a helical groove 85 in the valve-controlling shaft o; and it is obvious that, when the reversing lever 82 is thrown so as to move the hub 79 lengthwise of the valve-controlling shaft o, this shaft o will be turned through a sufficient distance to change the position of the engine-valves s, whereby the engine will be reversed.

The operation of the apparatus hereinbefore described will be readily understood, when the foregoing description is read in connection with the drawings. In starting the engine by hand the relief-cocks 86 which communicate with the cylinders of the air-compressors 3 may be opened temporarily. The relief-valve 87 in the air-pipe 9, which connects the air-compressors, is closed, as are also the valve 88 in the small pipe 90 and the valve 89 in the pipe 46. These pipes 90, 46, connect the compressed-air tank 47 with the conduits 9, 10, respectively. If the oil in the oil reservoir 15 and the water in the tank 20 are not at their normal levels, the operator seizes the handle 70 of the lever 68 and operates the pumps until the oil and water are brought to their normal levels. The spark-plug 55 is made operative by closing a switch (not shown). The flywheel k may now be turned by hand, whereby the air-compressors 3 are driven and are made to force compressed air through the conduit 9, past the valve 91 into the main air-feed pipe 10 and thence through the latter and the branch inlet-pipe to the atomizer-chamber 41, and past the valve 52 and through the air-passage 48 into the combustion-chamber 17. As the engine warms up, the working fluid will be supplied to the working cylinders a at a constantly increasing temperature and will assist in driving the engine-shaft, until finally the engine runs by itself. The relief-cocks 86 are then closed and the valve 88 is opened. In starting the engine under power stored in the compressed-air tank 47, as may, for example, be done after a stoppage of short duration, the relief valve 87 in the air-pipe 9 and the relief-cocks 86 may be opened and the valve 88 in the small air-pipe 90 is closed. The valve 89 in the pipe 46 is opened and air under pressure flows from the air-tank 47 into the main air-feed pipe 10, closing automatically the gravity-controlled check-valve 91 therein. The air flows from the main air-feed pipe 10 through the atomizer 35 and into the combustion chamber 17, as just set forth in connection with the description of starting the engine by hand. The valve 87 is closed; and after the engine is fully started, the air-cocks 86 are closed and the valve 88 in the small air-pipe 90 is opened to permit a small portion of the compressed air to flow from the conduit 9 into the compressed air-tank 47 past the check valve 92 in the pipe 90. Thus a supply of compressed air is kept constantly on hand for starting the engine by compressed air after short stoppages. In case the load upon the engine becomes abnormally great, as in ascending a steep grade, for example, the relief valve 87 and the valve 89 may be opened so that power will be derived from the air-tank 47 and the power normally used in compressing the air will also be available for propelling the apparatus for a short period. The power of the engine may also be controlled by turning the throttle-valve 93 which is provided with a handle 93' and is formed with ports 93" and which may be brought into more or less complete register with the inlet conduits t which lead to the valve chambers r in which are mounted the engine-valve s.

The supply-pipe 94 of the water-pump 18 may be so connected as to draw water from the water-chambers 7 with which the air-compressors 3 are provided; and in case the engine is connected with a condenser, this supply-pipe may also be connected with the hot-well of the condenser, whereby preheated water may be furnished to the water-jacket 20 of the furnace 11 and thence to the steam-generating chamber 23.

Where an engine of low first cost is desired, the form of engine shown in Fig. 12 will be found suitable. In this form the motor and air-compressor are combined, the motor 95 being single acting and the upper portion of the working cylinder 96 being arranged to receive the working fluid, while the air is compressed in the lower portion 97 of this cylinder. The effective area of the lower face of the piston 98 is less than that of the upper face thereof, since the piston-rod 99 is attached to the lower face. The other parts of the apparatus remain substantially the same as in the preferred embodiment of this invention, except that their location or disposition relative to the motor is changed so as to make the entire structure as compact as practicable. In the engine shown in Fig. 1, the ratio of the piston-area of the air-compressors 3 to the piston-area of the working cylinders $a$ may be varied, as may also be the stroke of the pistons of the air-compressors 3. These are matters of mere design.

It is to be observed that the products of combustion in their passage from the combustion chamber 17 to the steam-generating chamber 23 flow through the substantially U-shaped passage $17^x$ and press upon and force their way through any water which may be lying in the bottom of the latter. From this construction it results that the combustion chamber is kept substantially free from water, which is an important feature in an apparatus of this character. Moreover, since the hot products of combustion are forced into intimate contact with the water in the bottom of the chamber 23, the water is broken up and becomes heated and transformed into steam, while the products of combustion are correspondingly cooled. Again, the chain-links 32 afford a large heating surface against which impinge the products of combustion and the water-particles now entrained therein. The products are divided into numerous fine streams and give up their heat to chain-links 32, while the entrained moisture and the water-vapor take up heat therefrom and from the gases with the result that the latter are cooled and the water particles are vaporized and the water-vapor may be even transformed into superheated steam. The working fluid which results from this mixture enters the working cylinders $a$ at a temperature which is not injurious to the working parts of the engine but yet is high enough to insure an efficient operation thereof. It follows that the chain-links 32 constitute a heat-transferring surface which is of great extent, readily and cheaply provided and easily kept in repair. If desired, the size of the links may be varied, large links being placed near the passage $17^x$ where the heat acting on the chain is the greatest. For ease in manipulation, the links 32 are connected to form a chain.

In case it be desired to store air under a pressure higher than that normally generated by the air-compressors 3, there may be provided for this purpose an independent air-compressor (not shown) which would be driven from the engine-shaft $i$ and connected by suitable piping with the compressed air tank 47. In this case the small pipe 90 which in Fig. 1 connects the conduit 9 with the latter may be omitted. A quantity of air thus stored under high pressure will be found useful in an emergency where there is a sudden call for a large expenditure of energy in a short time (for instance, in starting locomotives, automobiles and the like).

For the successful performance of an apparatus of this kind it is essential that the combustion of the oil be sustained and uniform during the working of the engine. It is to be observed that the wall 40 which surrounds the opening in which is mounted the atomizer 35 is water-cooled, so that the oil is prevented from being unduly preheated and broken up into its constituents, decomposed or vaporized before its admission into the combustion chamber 17; and thus the richness of the combustible mixture is maintained and deposits of carbon in the oil-inlet passage are avoided. Further, the inlet-end of the oil-passage 39 is arranged to lie above the air-inlet passage 44 and is inclined thereto, whereby any dripping of the oil will be directed into the air-current and not away from it. In this way an intimate mixing of the oil and air and a thorough atomization of the oil is insured.

The reversing-lever 82 may be connected with the switch controlling the battery circuit of the spark plug 55 by interlocking mechanism (not shown) in such manner that, when the engine is reversed, the spark-plug 55 will be made operative and the mixture issuing from the nozzle of the atomizer 35 will be ignited as the engine starts in the reverse direction.

The steam-generator 23 may be provided with a fusible plug $23^x$ which will melt in case the temperature in the steam-generator becomes too high by reason of a failure of the water-supply or other cause, whereupon the engine will stop or slow down (the pressure rapidly falling) and warning of the faulty working is given in this way and by the noise produced by the escape of the gases.

Although the motor herein shown is an engine of the reciprocating type, yet other types of motor may be employed; for example, motors of the turbine type may be used and will be found particularly well adapted for marine purposes.

I claim:

1. An apparatus of the character described, including fuel-feeding devices; a furnace having a substantially horizontally-disposed combustion-chamber and provided with means for burning the fuel; a substantially vertically-disposed steam-generator which communicates with said combustion-chamber through a substantially U-shaped passage arranged at the outlet end thereof; and means for supplying water to said steam-generator.

2. An apparatus of the character described, including fuel-feeding devices; a furnace having a combustion-chamber and provided with means for burning the fuel; a steam-generator which communicates with said combustion-chamber through a substantially U-shaped passage and which is provided with heat-transferring devices adapted and designed to retard the flow of the products of combustion and to divide the same into numerous fine streams; and means for supplying water to the steam-generator.

3. An apparatus of the character described, including fuel-feeding means; a furnace provided with means for burning the fuel; means for supplying air to said furnace at a substantial distance beyond said fuel-feeding means, whereby complete combustion of the fuel is insured; and mechanism which insures that the back pressure overcome by the air flowing from said air-supplying means into said furnace shall be greater than the back pressure acting upon the fuel issuing from said fuel-feeding means.

4. An apparatus of the character described, including an atomizer; a source of compressed-air connected with said atomizer; means for igniting the fuel issuing from the latter; a conduit which is connected with said source of compressed-air and said furnace; and a loaded valve which controls the furnace end of said conduit and insures that the back pressure overcome by the air flowing therefrom into said furnace shall be greater than the back pressure acting upon the fuel issuing from said atomizer.

5. An apparatus of the character described, including fuel-feeding means; a furnace in which the fuel is burned; a steam-generator which communicates with the furnace; a water reservoir which supplies water to the steam-generator and which is symmetrical in form; and an inlet to the passage through which the water trickles to the steam-generator, said inlet being centrally-disposed in the water reservoir, whereby tilting of the latter is prevented from exercising any substantial effect upon the amount of water supplied from the water reservoir to the steam-generator.

6. An apparatus of the character described, including fuel-feeding means; a furnace in which said fuel is burned; a steam-generator which communicates with said furnace; a water reservoir which supplies water to the steam-generator; and an inlet to the passage through which the water trickles to the steam-generator, said inlet being independent of the variations in the water level in the water reservoir, whereby tilting of the latter is prevented from exercising any substantial effect upon the amount of water supplied from the water reservoir to the steam-generator.

7. An apparatus of the character described including fuel-feeding devices; a furnace provided with means for burning the fuel therein; a steam-generator which is separate from but communicates with said furnace; and a coil which is mounted in and through which water is supplied to said steam-generator and which is arranged in the path of flow of the products of combustion from said furnace, whereby the water flowing through the coil is preheated.

Signed at the borough of Manhattan, in the city, county and State of New York, this seventeenth day of June, A. D., 1912, in the presence of the two undersigned witnesses.

OTTO KRAUS.

Witnesses:
JAMES HAMILTON,
EMMA I. MCCARTHY.